United States Patent [19]

Murakami

[11] Patent Number: 5,894,357
[45] Date of Patent: Apr. 13, 1999

[54] COLOR SEPARATION OPTICAL SYSTEM

[75] Inventor: Takashi Murakami, Omiya, Japan

[73] Assignee: Fuji Photo Optical Co., Ltd., Omiya, Japan

[21] Appl. No.: 08/936,534

[22] Filed: Sep. 24, 1997

[30] Foreign Application Priority Data

Oct. 16, 1996 [JP] Japan ................................. 8-294438

[51] Int. Cl.$^6$ ..................................................... H04N 1/04
[52] U.S. Cl. ........................... 358/515; 358/512; 358/527
[58] Field of Search ................................... 358/515, 500, 358/527, 512, 520, 530; 382/162, 163, 167; 359/131; 290/363.02, 363.1

[56] References Cited

U.S. PATENT DOCUMENTS

| | | | |
|---|---|---|---|
| 3,664,248 | 5/1972 | Mueller | 95/12.2 |
| 4,831,452 | 5/1989 | Takanashi et al. | 358/213.14 |
| 5,032,007 | 7/1991 | Silverstein et al. | 350/335 |
| 5,341,245 | 8/1994 | Tamagawa | 359/739 |

FOREIGN PATENT DOCUMENTS 6-18808  6/1994  Japan ................................. H04N 1/04

*Primary Examiner*—Thomas D. Lee
*Assistant Examiner*—Jerome Grant, II
*Attorney, Agent, or Firm*—Ronald R. Snider

[57] ABSTRACT

A polarizing plate, two phase plates having predetermined phase differences, two birefringence plates are disposed on a common optical axis, thereby effecting color separation of three color light components of R, G, and B as well as positional separation of their optical paths in a simple configuration without using color filters. A first phase plate (7) and a first birefringence plate (8) are used to separate, in terms of color and position, linearly polarized light carrying color image information into a cyan color component (CL) and a yellow color component (YL). Then, a second phase plate (9) and a second birefringence plate (10) are used to separate, in terms of color and position, the cyan color component (CL) and yellow color component (YL) into a blue color component (BL), a green color component (GL), and a red color component (RL), so as make them incident on their corresponding line sensors (11A, 11B, 11C) on a light receiving means (11).

5 Claims, 5 Drawing Sheets

F I G. 2
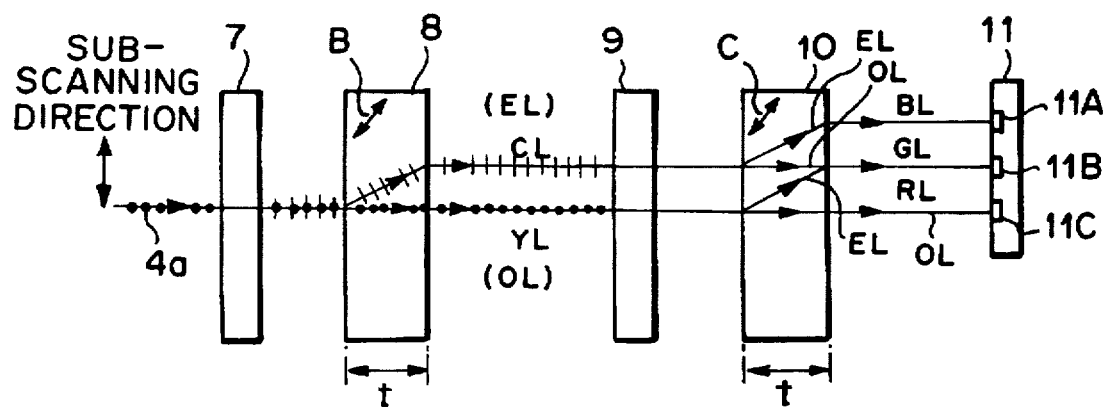
F I G. 3
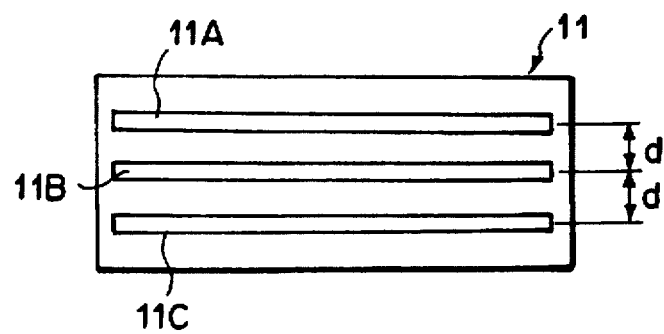

COLOR SEPARATION OPTICAL SYSTEM

RELATED APPLICATIONS

This application claims the priority of Japanese Patent Application No. 8-294438 filed on Oct. 16, 1996, which is incorporated herein by reference.

BACKGROUND OF THE INVENTION

1. Field of the Invention

The present invention relates to a color separation optical system loaded in a color image readout apparatus and, more specifically, to a color separation optical system suitable for scanner, facsimile, and the like in particular, which separates, in terms of color, a luminous flux reflected by or transmitted through an object, such as an original with a color image, illuminated with light, and outputs thus separated color light components to imaging means comprising a plurality of line sensors.

2. Description of the Prior Art

Conventionally have been developed are various kinds of color image readout apparatus in which the surface of an original with a color image is illuminated with a luminous flux from a light source, the reflected luminous flux is separated in terms of color through a slit, and thus separated color light components are guided to their corresponding line sensors, so that the color image information on the original is read out.

For example, there has been known an apparatus in which a reflected luminous flux from a color image on an original surface is successively made incident, by way of an imaging lens, on two pieces of beam splitters each having a dichroic film, whereby the luminous flux is separated into three color light components of R, G, and B, which are guided onto their corresponding line sensors, so that the color image information is read out.

The distance between adjacent lines in a line sensor used in general is about 0.1 mm or less, for example. In this case, the thickness of a beam splitter becomes on the order of several ten μm or less. In order to manufacture a beam splitter having such a small thickness, it is difficult to favorably maintain an optical flatness, whereby the line sensor may lower its readout accuracy.

Accordingly, there has been proposed a technique (Japanese Unexamined Patent Publication No. 6-18808) in which, in order to separate a luminous flux carrying color image information into three color components, a color separation optical system combining together an RGB three-color filter and an optical element such as polarizing plate and birefringence plate is used in place of the beam splitter such as that mentioned above.

In the above-mentioned technique, however, since the individual color light components are separated through the RGB three-color filter composed of wavelength-selective filters, so as to be guided onto their corresponding line sensors, the luminous flux reaching onto the line sensors greatly attenuates. Also, the combination of optical elements varies among the individual color light components, thus complicating the optical system and its assembling operation.

SUMMARY OF THE INVENTION

In view of such circumstances, it is an object of the present invention to provide a color separation optical system which can separate, in terms of color, light carrying color image information without using a color filter which attenuates a luminous flux or a beam splitter which lowers the readout accuracy for image information and without complicating the optical system.

The color separation optical system in accordance with the present invention is loaded in a color image readout apparatus in which an object is illuminated with light from a light source, the light reflected by or transmitted through the object and subsequently emitted through a slit extending in a predetermined direction is separated in terms of color, and thus separated color light components are respectively caused to form images on linear imaging means corresponding thereto;

the color separation optical system comprising, successively from the object side, a polarizing plate, a first phase plate, a first birefringence plate, a second phase plate, and a second birefringence plate which are disposed on a common optical axis;

wherein the first phase plate and the first birefringence plate separate linearly polarized light, having a plane of vibration in a predetermined direction, emitted from the polarizing plate into a cyan light component and a yellow light component while isolating optical path positions of thus separated cyan and yellow light components from each other;

wherein the second phase plate and the second birefringence plate separate the cyan light component emitted from the first birefringence plate into a blue light component and a green light component while isolating optical path positions of thus separated blue and green light components from each other, and separate the yellow light component emitted from the first birefringence plate into a green light component and a red light component while isolating optical path positions of thus separated green and red light components from each other; and wherein the blue, green, and red light components thus separated in terms of color and position are emitted so as to be irradiated onto the imaging means corresponding thereto.

Preferably, the color image readout apparatus performs sub-scanning by relatively moving the object and the slit with respect to each other in a direction orthogonal to both the direction in which the slit extends and the common optical axis.

Preferably, the first phase plate is configured so as to impart between linearly polarized light components orthogonal to each other a first phase difference corresponding to a predetermined wavelength of red light. In this case, the second phase plate is preferably configured so as to impart between linearly polarized light components orthogonal to each other a second phase difference which is twice as large as the first phase difference.

Further, the first and second birefringence plates are preferably made of an identical material with a substantially identical thickness.

BRIEF DESCRIPTION OF THE DRAWINGS

FIG. 2 is a schematic view showing the color separation optical system in accordance with an embodiment of the present invention;

FIG. 3 is a front view showing a light receiving means shown in FIG. 2;

DETAILED DESCRIPTION OF THE PREFERRED EMBODIMENTS

In the following, embodiments of the present invention will be explained with reference to the accompanying drawings.

Figure 1:
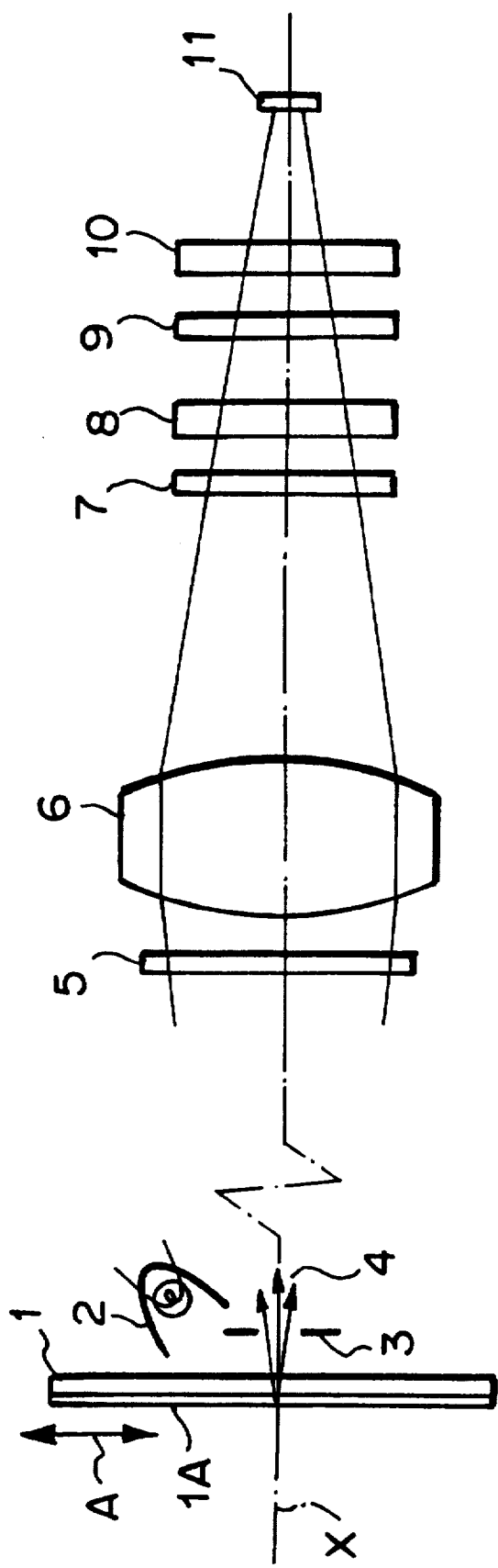
FIG. 1 is a schematic view showing an example of a color scanner apparatus loaded with a color separation optical system in accordance with the present invention.

FIG. 1 is a schematic view showing an example of a color scanner apparatus using a color separation optical system in accordance with the present invention; whereas FIGS. 2 and 3 are views for respectively explaining parts of the system. The color scanner apparatus irradiates a luminous flux of white light from a light source 2 onto an original 1A including a color image set on the back side of an original glass plate 1; causes a luminous flux 4 carrying color image information reflected by the original 1A to be made incident on a light separation and imaging optical system 5 to 10 through a slit of a slit plate 3; and separates the luminous flux 4 into three color light components of R, G, and B and isolate optical path positions of these three light components from each other by means of the light separation and imaging optical system 5 to 10, so that the three color light components are guided onto and form images respectively on three monochromic line sensors 11A, 11B, and 11C formed on a light receiving means 11.

Consequently, information corresponding to one line of the color image is read out (main scanning is performed). Thereafter, as the light receiving means 11 continuously performs the image readout operation while the original 1A and the slit 3 are relatively moved with respect to each other (subjected to sub-scanning) in the directions of depicted arrows A, the readout operation is effected for the whole image region of the original 1A.

Here, the light receiving means 11 is a monolithic three-line sensor in which the three pieces of monochromic line sensors 11A, 11B, and 11C are disposed on a single substrate.

The color separation and imaging optical system 5 to 10 comprises a polarizing plate 5, an imaging lens 6, a first phase plate 7, a first birefringence plate 8, a second phase plate 9, and a second birefringence plate 10.

In the following, the color separation and imaging optical system 5 to 10 will be explained in detail. First, the polarizing plate 7 turns the luminous flux 4 into linearly polarized light, and the imaging lens 6 converges the linearly polarized light. The first and second phase plates 7 and 9 disposed within the converged optical path each separate the incident linearly polarized light into two linearly polarized light components (P-polarized light component and S-polarized light component) whose planes of vibration are orthogonal to each other and, while imparting a predetermined phase difference $\Delta\lambda$ therebetween, output the two linearly polarized light components to each of the first and second birefringence plates 8 and 10 respectively disposed downstream thereof within the converged optical path.

The phase difference $\Delta\lambda$ imparted between these two components are adjustable by changing the thickness values of the phase plates 7 and 9 or the like. Here, the phase difference $\Delta\lambda$ of the first phase plate 7 is set to 656.25 nm, whereas that of the second phase plate 9 is set to 1,312.5 nm.

Figure 4:
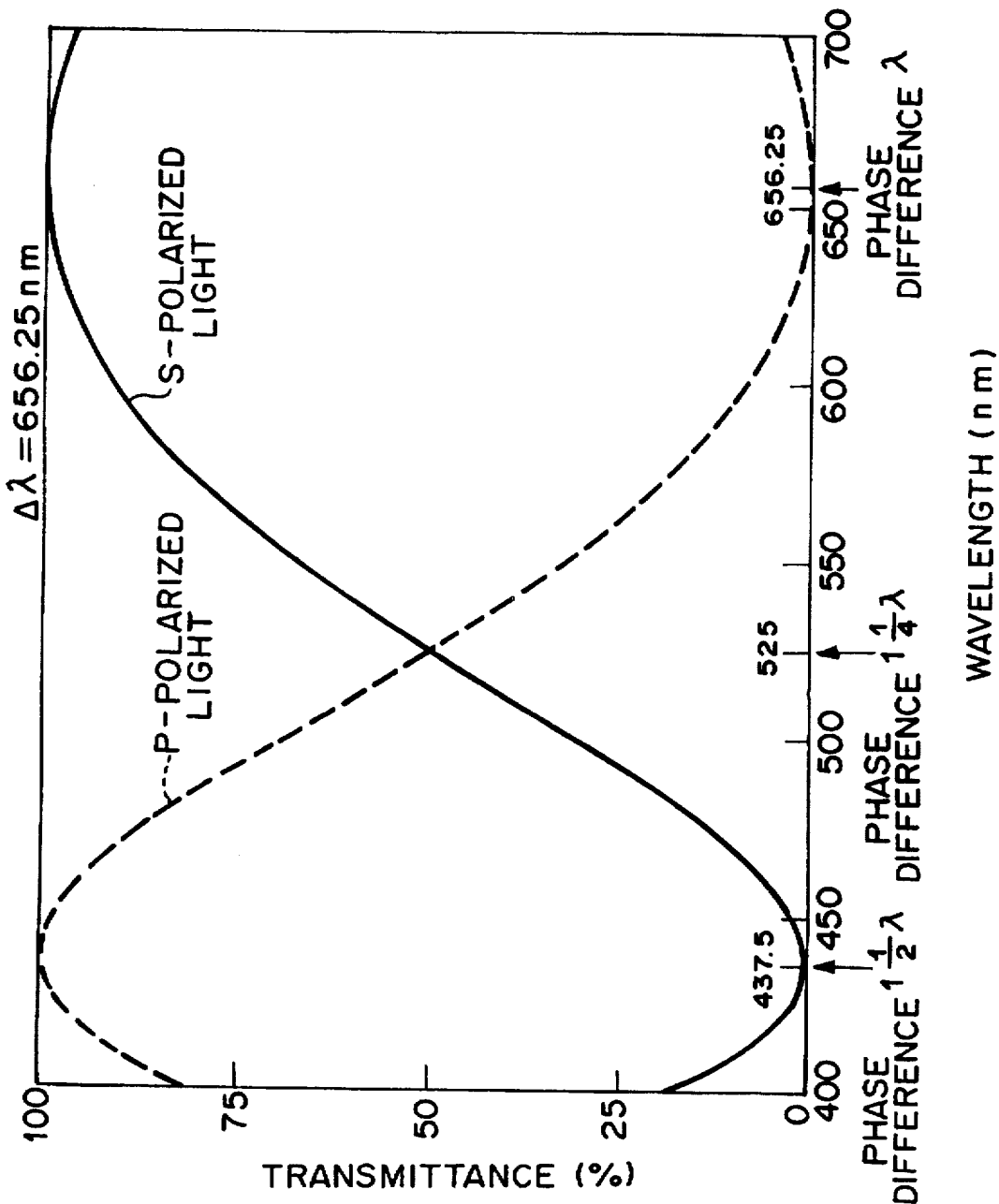
FIG. 4 is a graph showing transmittance characteristics of a first phase plate with respect to two polarized light components orthogonal to each other.
Figure 5:
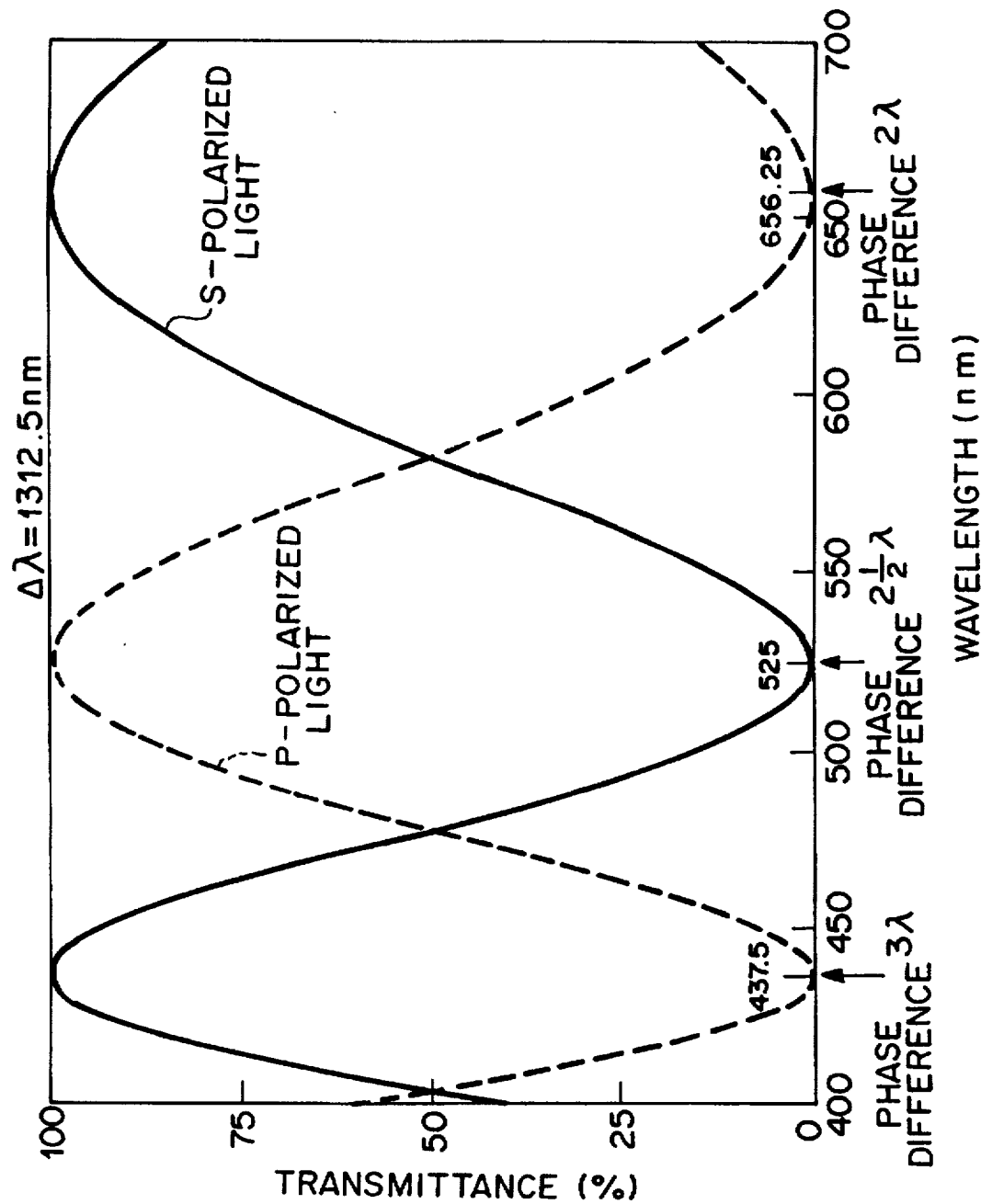
FIG. 5 is a graph showing transmittance characteristics of a second phase plate with respect to two polarized light components orthogonal to each other.

Namely, FIGS. 4 and 5 respectively show transmittance characteristics of the first and second phase plate 7 and 9 with respect to each of P-polarized and S-polarized light components in the case where the S-polarized light component is incident thereon.

The two phase plates 7 and 9 may be made of a plastic sheet or a birefringence crystal, with the latter enabling a higher accuracy in phase difference than with the former. Since the second phase plate 9 has a phase difference twice as large as that of the first phase plate 7, the second phase plate 7 may be constituted by two sheets of first phase plates 7 overlaid on each other with their optic axes aligned.

Each of the phase plates 7 and 9 is disposed so that their optic axis forms an angle of 45 degrees with respect to the main scanning direction. The two birefringence plates 8 and 10 respectively disposed downstream thereof are set such that their optic axes are inclined with respect to the optical axis within the plane of incidence by 45 degrees as indicated by arrows B and C. Consequently, of the incident luminous flux, an ordinary light beam OL whose plane of vibration aligns with the extending direction of the slit 3 (main scanning direction) within the birefringence plates 8 and 10 are emitted so as to directly advance as it is, whereas an extraordinary light beam EL whose direction of plane of vibration aligns with the sub-scanning direction is emitted as being shifted by a predetermined amount in the sub-scanning direction.

Since these two birefringence plates 8 and 10 are made of an identical material with an identical thickness, the extraordinary light beam EL yields the same amount of shift with respect to the ordinary light beam OL therein. Here, the birefringence plates 8 and 10 may be formed by various kinds of uniaxial crystals such as KDP, ADP, calcite, and quartz.

In the following, operations of the color separation and imaging optical system 5 to 10 will be explained.

A luminous flux 4a carrying color image information, which is turned into linearly polarized light (S-polarized light) having a plane of vibration in the slit direction (main scanning direction) by the polarizing plate 5 and then into a convergent luminous flux by the imaging lens 6, is initially separated into P-polarized and S-polarized light components by the first phase plate 7. The first phase plate 7 is configured so as to impart a phase difference $\Delta\lambda$ of 656.25 nm between these two components. Accordingly, as shown in FIG. 4, phase differences of 1 wavelength, 1 wavelength+¼ wavelength, and 1 wavelength+½ wavelength are imparted between the P-polarized and S-polarized light components with respect to light at wavelengths of 656.25 nm, 525 nm, and 437.5 nm, respectively.

Namely, the first phase plate 7 apparently functions so as to generate no phase shift with respect to red light ($\lambda$=656.25 nm), as a quarter-wave plate with respect to green light ($\lambda$=525 nm), and as a half- wave plate with respect to blue light ($\lambda$=437.5 nm). Its transmittance with respect to the P-polarized light component is 0% at the wavelength of 656.25 nm, 50% at 525 nm, and 100% at 437.5 nm, thereby yielding cyan light (CL) as a whole. On the other hand, its transmittance with respect to the S-polarized light component is 100% at 656.25 nm, 50% at 525 nm, and 0% at 437.5 nm, thereby yielding yellow light (YL) as a whole.

Accordingly emitted from the first phase plate 7 are P-polarized light having a component biased toward cyan light (CL) and S-polarized light having a component biased toward yellow light (YL) which are superposed on each other.

Then, when the resulting luminous flux is incident on the first birefringence plate 8, since the direction of optic axis in the first birefringence plate 8 is set as indicated by arrows B, the S-polarized light component directly advances as an ordinary light beam OL, whereas the P-polarized light component is refracted in the sub-scanning direction (a direction of arrows A) as an extraordinary light beam EL, whereby they are separated from each other and thereafter advance as luminous fluxes separated from each other by a predetermined distance d. In this case, the S-polarized light component that is yellow light (YL) has become the ordinary light beam OL; whereas the P-polarized light component that is cyan light (CL) has become the extraordinary light beam EL. Accordingly, two luminous fluxes of yellow light (YL) and cyan light (CL) are emitted from the first birefringence plate 8.

Subsequently, these two parallel luminous fluxes are made incident on the second phase plate 9, and each of them is separated into P-polarized and S-polarized light components again. The second phase plate 9 is configured so as to impart a phase difference $\Delta\lambda$ of 1,312.5 nm between the P-polarized and S-polarized light components with respect to each luminous flux incident thereon. Accordingly, as shown in FIG. 5, phase differences of 2 wavelengths, 2 wavelengths+½ wavelength, and 3 wavelengths are imparted between the P-polarized and S-polarized light components with respect to light at wavelengths of 656.25 nm, 525 nm, and 437.5 nm, respectively.

Namely, the second phase plate 9 apparently functions so as to generate no phase shift with respect to red light ($\lambda$=656.25 nm), as a half- wave plate with respect to green light ($\lambda$=525 nm), and so as to generate no phase difference with respect to blue light ($\lambda$=437.5 nm).

Its transmittance with respect to the P-polarized light component is 0% at the wavelength of 656.25 nm, 100% at 525 nm, and 0% at 437.5 nm. On the other hand, its transmittance with respect to the S-polarized light component is 100% at 656.25 nm, 0% at 525 nm, and 100% at 437.5 nm. Accordingly, with respect to the cyan light (CL) incident on the second phase plate 9, the S-polarized light component exhibits such a characteristic in which the curves of P-polarized light shown in FIGS. 4 and 5 are multiplied together, thereby yielding green light (GL) with an amplitude attenuated to about ½. On the other hand, the P-polarized light component exhibits such a characteristic in which the curve of P-polarized light shown in FIG. 4 and the curve of S-polarized light shown in FIG. 5 are multiplied together, thereby yielding blue light (BL). Also, with respect to the yellow light (YL) incident on the second phase plate 9, the P-polarized light component exhibits such a characteristic in which the curve of S-polarized light shown in FIG. 4 and the curve of P-polarized light shown in FIG. 5 are multiplied together, thereby yielding green light (GL) with an amplitude attenuated to about ½. On the other hand, the S- polarized light component exhibits such a characteristic in which the curves of S-polarized light shown in FIGS. 4 and 5 are multiplied together, thereby yielding red light (RL).

Accordingly emitted from the second phase plate 9 are a luminous flux in which S-polarized light having a green light component (GL) with an amplitude of about ½ and P-polarized light having a blue light component (BL) are superposed on each other, and a luminous flux in which P-polarized light having a green light component (GL) with an amplitude of about ½ and S-polarized light having a red light component (RL) are superposed on each other.

Then, when the two luminous fluxes 4a from the second phase plate 9 are incident on the second birefringence plate 10, since the direction of optic axis in the second birefringence plate 10 is set as indicated by arrows C, the ordinary light beam OL directly advances, whereas the extraordinary light beam EL is refracted in the sub-scanning direction (a direction of arrows A), whereby they are separated from each other and thereafter advance as parallel luminous fluxes separated from each other by a predetermined distance d.

In this case, the S-polarized light component that is green light (GL) separated from cyan light (CL) becomes an ordinary light beam OL; whereas the P-polarized light component that is blue light (BL) becomes an extraordinary light beam EL.

Also, the P-polarized light component that is green light (GL) separated from yellow light (YL) becomes an extraordinary light beam EL; whereas the S-polarized light component that is red light (RL) becomes an ordinary light beam OL.

The distance between the two luminous fluxes 4a incident on the second birefringence plate 10 is equal to the width of separation between the extraordinary light beam EL and the ordinary light beam OL that are isolated from each other within the second birefringence plate 10, whereby the green light component (GL) that is the ordinary light beam OL separated from cyan light (CL) and the green light component (GL) that is the extraordinary light beam (EL) separated from yellow light (YL) are emitted from the same position of the second birefringence plate 10. Since each of these two green light components (GL) is attenuated to about ½ in terms of amplitude, green light (GL) is adjusted to its original amplitude when these two light components (GL) are added together as being superposed on each other.

Accordingly emitted from the second birefringence plate 10 are three color light components of BL, GL, and RL as parallel luminous fluxes with intervals of the distance d therebetween.

The three luminous fluxes respectively formed by the three color light components BL, GL, and RL are made incident on their corresponding monochromic line sensors 11A, 11B, and 11C on the light receiving means 11. As shown in FIG. 3, the distance between the three line sensors 11A, 11B, and 11C is d, coinciding with the distance d between the three luminous fluxes emitted from the second birefringence plate 10.

Figure 6:
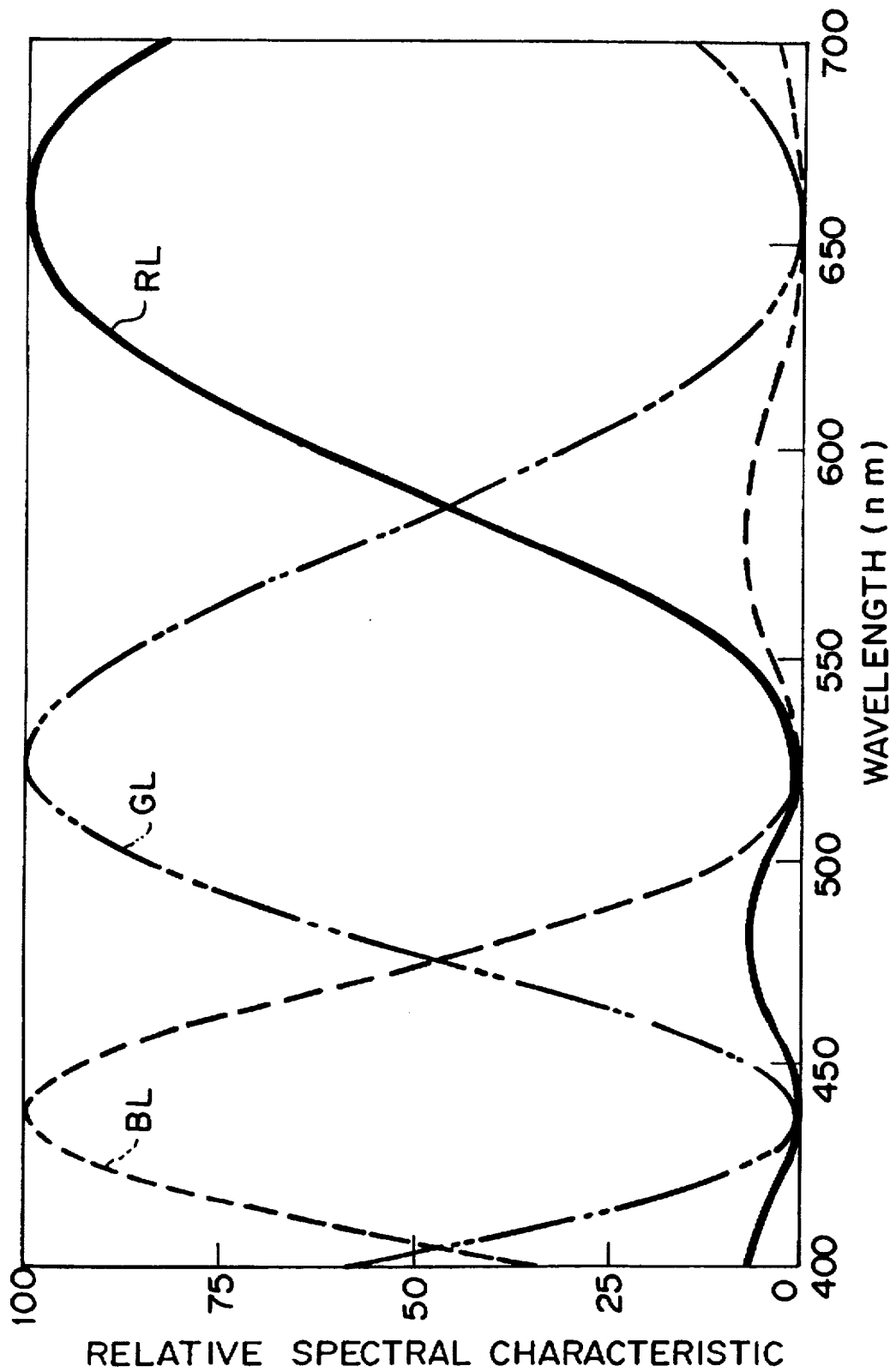
FIG. 6 is a graph showing relative spectral characteristics of three color light components emitted from a second birefringence plate.

FIG. 6 shows relative spectral characteristics of the above-mentioned three luminous fluxes emitted from the second birefringence plate 10 in the case where white light is separated in terms of color by means of the apparatus of the above-mentioned embodiment. As depicted, the three color light components BL, GL, and RL, which have securely been separated in terms of color and position, are securely guided to their corresponding line sensors 11A, 11B, and 11C.

Also, the two birefringence plates 8 and 10 have the same thickness t, whose relationship to the amount of shift d (distance between the luminous fluxes) of the extraordinary light beam EL from the ordinary light beam OL is expressed by d=0.0059 t, for example, in the case of a quartz birefringence plate.

Accordingly, when the distance between the line sensors 11A, 11B, and 11C is 10 μm, for example, it is necessary for the amount of shift d to be 10 μm, whereby the thickness of each of the birefringence plates 8 and 10 is set to 1.7 mm.

Without being restricted to the foregoing embodiment, the color separation optical system in accordance with the present invention may be modified in various manners. For example, the positions of polarizing plate and imaging lens may be exchanged, the polarizing plate may transmit P-polarized light therethrough, and additional optical elements such as infrared cut filter may be inserted therein. Also, as the birefringence plate, a biaxial crystal which separates an incident luminous flux into two extraordinary light beams may be used.

Though the amount of shift of extraordinary light beam may not necessarily be the same in the two birefringence plates, two green luminous fluxes are yielded when the amount of shift differs therebetween, thus necessitating four pieces of line sensors in total. In this case, it is necessary for the output values from two line sensors for green light to be added together so as to attain final green light information.

The color separation optical system in accordance with the present invention is applicable not only to color scanners in a narrow sense but also to various kinds of image readout apparatus having means for optically scanning an object and reading out image information of the object.

As explained in the foregoing, the color separation optical system in accordance with the present invention uses only a polarizing plate, two phase plates, and two birefringence plates so as to separate light carrying color image information into three color components of R, G, and B, and isolate optical path positions of these three light components from each other. Unlike the prior art, since no color filter is used therein, optical efficiency can be greatly improved.

Also, since the individual optical elements are successively disposed on a common optical axis, the assembling process for the optical system can be made easier.

Further, since it is sufficient for each line sensor to be monochromatic, the cost required for imaging means can be reduced.

In the case where the two birefringence plates are made of an identical material with an identical thickness, of light components separated from two luminous fluxes incident on the second birefringence plate, two green light components can be positionally superposed on each other at the time of emission, whereby the light beams emitted from the second birefringence plate can be efficiently read out by the three monochromic line sensors.

What is claimed is:

1. A color separation optical system loaded in a color image readout apparatus in which an object is illuminated with light from a light source, the light reflected by or transmitted through said object and subsequently emitted through a slit extending in a predetermined direction is separated in terms of color, and thus separated color light components are respectively caused to form images on linear imaging means corresponding thereto;

said color separation optical system comprising, successively from said object side, a polarizing plate, a first phase plate, a first birefringence plate, a second phase plate, and a second birefringence plate which are disposed on a common optical axis;

wherein said first phase plate and said first birefringence plate separate linearly polarized light emitted from said polarizing plate into a cyan light component and a yellow light component while isolating optical path positions of thus separated cyan and yellow light components from each other, said linearly polarized light having a plane of vibration in a predetermined direction;

wherein said second phase plate and said second birefringence plate separate the cyan light component emitted from said first birefringence plate into a blue light component and a green light component while isolating optical path positions of thus separated blue and green light components from each other, and separate the yellow light component emitted from said first birefringence plate into a green light component and a red light component while isolating optical path positions of thus separated green and red light components from each other; and wherein the blue, green, and red light components thus separated in terms of color and position are emitted so as to be irradiated onto said imaging means corresponding thereto.

2. A color separation optical system according to claim 1, wherein said color image readout apparatus performs sub-scanning by relatively moving said object and said slit with respect to each other in a direction orthogonal to both the direction in which said slit extends and said common optical axis.

3. A color separation optical system according to claim 1, wherein said first phase plate is configured so as to impart between two linearly polarized light components orthogonal to each other a first phase difference corresponding to a predetermined wavelength of red light.

4. A color separation optical system according to claim 3, wherein said second phase plate is configured so as to impart between two linearly polarized light components orthogonal to each other a second phase difference which is twice as large as said first phase difference.

5. A color separation optical system according to claim 1, wherein said first and second birefringence plates are made of an identical material with a substantially identical thickness.

* * * * *